Aug. 11, 1942.        S. A. SNELL        2,292,719
BRAKE INDICATOR STRUCTURE
Filed Feb. 24, 1940
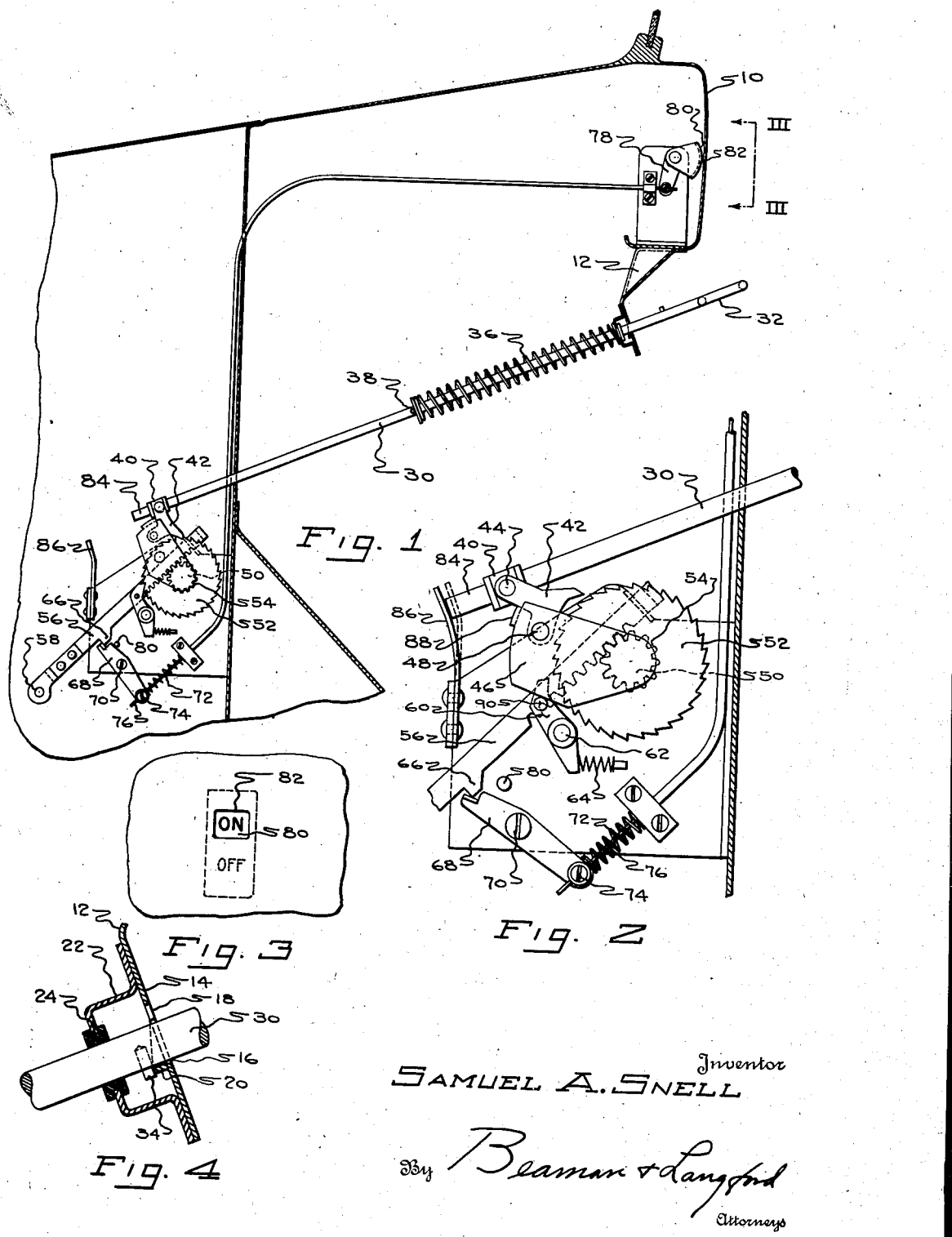
Inventor
SAMUEL A. SNELL
By Beaman & Langford
Attorneys Patented Aug. 11, 1942

2,292,719

UNITED STATES PATENT OFFICE 2,292,719

BRAKE INDICATOR STRUCTURE

Samuel A. Snell, Jackson, Mich., assignor to Townsend F. Beaman, Jackson, Mich., as trustee Application February 24, 1940, Serial No. 320,588

2 Claims. (Cl. 116—124)

The present invention relates to parking brake structure for automobiles, being concerned with the type broadly disclosed in my co-pending application Serial No. 253,985, filed February 1, 1939; and the present application is considered to be a continuation-in-part of my co-pending application Serial No. 308,609, filed December 11, 1939.

The primary object of the present invention is to provide an improved indicator for advising the driver of the automobile that the parking brake is either fully released or at least partially applied.

Another object is to provide a brake indicator in which the "off" and "on" indications are directly controlled by a part which is always bodily re-located upon brake application or release.

A further object is to provide an "off" and "on" indicator for parking brakes having actuators of the type disclosed in my application Serial No. 308,609, filed December 11, 1939, in which the hand grip is returnable to its initial position following brake application without brake release.

These and other objects and advantages residing in the combination, construction and arrangement of parts will more clearly appear from the following specification and claims.

In the drawing,

Fig. 1 is a cross-sectional view through the dash and instrument panel of the automobile showing the parking brake actuator and indicator in side elevation with the brakes applied, Fig. 2 is an enlarged fragmentary side elevational view of the motion reducing unit showing the brakes being released, Fig. 3 is a fragmentary elevational view of the instrument panel showing the indicator dial, and Fig. 4 is an enlarged detail view of the brake releasing cam and pin structure.

Referring to the drawing, the instrument panel 10 carries a support 12 having a face plate 14 with a circular hole 16 with a slot 18 extending therein. At the time the hole 16 is formed the metal is pierced and turned as to provide a spiral cam flange 20. A bracket 22 fixed to the face plate 14 has an opening 24 into which is fitted a rubber grummet 28. Extending through the opening 16 and guided in the grummet 28 is a rod 30 having a hand grip 32 at its outer end. A pin 34 on the rod 30 passes through the slot 18 and rides upon the cam 20 to move the rod 30 axially upon partial rotation of the grip 32. A spring 36 embracing the rod 30 acts against a pin 38 on the rod 30 to urge the rod to its inward out-of-way position.

At the lower end, the rod 30 is equipped with a collar 40 which is pinned against relative axial movement while permitting the rod 30 to be partially rotated therein. A drive pawl 42 is pivotally connected at 44 to the collar 40 and to the plate 46 at 48. The plate 46 is in turn pivoted upon the shaft 50 upon which the ratchet wheel 52 and pinion 54 are supported for unitary rotation. A gear rack 56 meshes with the pinion 54 with provision at 58 for connection to the brakes. A holding pawl 60 pivoted at 62 engages the teeth of the wheel 52 under the urging of the spring 64 to lock the wheel 52 and pinion 54 in all positions of advancement by the pawl 42 effected by reciprocating movement of the rod 30.

Upon the rack 56 is a lug 66 which engages the lever 68 pivoted at 70 to compress the spring 72 when the brakes are released as shown in Fig. 2. Connected to the lever 68 at 74 is a Bowden wire 76 or other suitable flexible push-pull element which extends to a pivoted arm 78 which rocks a dial segment 80 from "off" to "on" positions when the rack 56 is moved toward the right to apply the brakes. In Fig. 1, the rod 30 is shown moved to the right by a partial brake applying stroke. A pin 81 limits the movement of the lever 68 to bring the "on" into alignment with the window 82 in the panel 10. Continued movement of the rack 56 in a brake applying direction has no effect upon the lever 68.

The spring 36 urges the rod 30 inwardly to an out-of-the-way position following an outward brake applying stroke, the end 84 engaging with the spring 86 as a stop. To release the brakes, partial rotation of the hand grip 32 will cause the pin 34 to traverse the cam 20 to urge the rod 30 further inwardly to flex the spring 86 as shown in Fig. 2. Such movement causes the pawl 42 to be disengaged with the teeth of the wheel 52 and to engage the stop 88 rocking the plate 46 sufficiently to raise the holding pawl 60 through encountering the pin 90. With the pawls 42 and 60 free, the ratchet wheel 52 and pinion 54 may rotate counter-clockwise enabling the rack to return to the position shown in Fig. 2. In this position the lug 66 has rocked the lever 68 to swing the dial into an "off" position as viewed through the window 82.

Indicators other than mechanically actuated are contemplated. For example, the lug 66 could actuate an "on" and "off" electrical switch lever located in an electrical circuit including a signal lamp mounted on the instrument panel or other convenient point.

Having described my invention, what I desire to protect by Letters Patent and claim is:

1. In a vehicle, the combination of a brake having a manually actuated member movable from inward position to an outward position to apply the brake and returnable to the inward position with the brake applied, the vehicle having a body within which said brake member is disposed, brake applying means actuated by said brake member, said brake applying mechanism being concealed from the view of the operator by a portion of said body, it thereby being impossible for the operator to visually observe the state of operation of said brake mechanism, an "on" and "off" indicator mounted on said body within view of the operator when in a position to manually move said brake member, and an operating connection between said brake applying mechanism and said indicator.

2. In a vehicle, the combination of a brake having a manually actuated member movable from inward position to an outward position to apply the brake and returnable to the inward position with the brake applied, the vehicle having a body within which said brake member is disposed, brake applying means actuated by said brake member, said brake applying mechanism being concealed from the view of the operator by a portion of said body, it thereby being impossible for the operator to visually observe the state of operation of said brake mechanism, an indicator having "on" and "off" positions, and means controlled by said brake applying mechanism urging said indicator into "on" position in all positions of brake application.

SAMUEL A. SNELL.